United States Patent [19]

Holzhauer et al.

[11] Patent Number: 4,866,416
[45] Date of Patent: Sep. 12, 1989

[54] ANTI-THEFT DEVICE FOR AN AUTOMOBILE AUDIO SET

[75] Inventors: Horst Holzhauer, Schellbronn; Günther Weikert, Weil Der Stadt; Rudi Kneib, Sindelfingen; Marko Polic, Sindelfingen; Peter Robitschko, Sindelfingen; Theodor Reinhard, Böblingen; all of Fed. Rep. of Germany

[73] Assignee: Daimler-Benz Aktiengesellschaft, Stuttgart, Fed. Rep. of Germany

[21] Appl. No.: 252,112

[22] Filed: Oct. 3, 1988

[30] Foreign Application Priority Data

Oct. 1, 1987 [DE] Fed. Rep. of Germany ....... 3733211

[51] Int. Cl.[4] .............................................. B60R 25/00
[52] U.S. Cl. .................................... 340/426; 455/346; 307/10.2; 340/568
[58] Field of Search ................. 340/63, 571, 568, 572, 340/825.31, 825.32; 307/10 AT; 455/345, 346, 348, 349

[56] References Cited

U.S. PATENT DOCUMENTS

| 4,720,700 | 1/1988 | Seibold | 340/568 |
| 4,803,460 | 2/1989 | Rhee et al. | 340/542 |
| 4,805,233 | 2/1989 | Robitschko et al. | 455/346 |

FOREIGN PATENT DOCUMENTS

| 2908517 | 9/1980 | Fed. Rep. of Germany |
| 3440379 | 5/1985 | Fed. Rep. of Germany |
| 8707406 | 9/1987 | Fed. Rep. of Germany |
| 3619523 | 12/1987 | Fed. Rep. of Germany |
| 2592345 | 7/1987 | France |

OTHER PUBLICATIONS

Catalog DS 4/410, Edition 1 (Pin and Socket), Connectors, Hirschmann Co., Esslingen, pp. 178-179.

Primary Examiner—Joseph A. Orsino
Assistant Examiner—Hollis T. Chen
Attorney, Agent, or Firm—Barnes & Thornburg

[57] ABSTRACT

An anti-theft device for a car radio having a theft module, which renders the car radio inoperative when the radio is slid out of its installation recess in the vehicle, is provided by a joint housing for a power supply and anti-theft protection plug connection elements, as well as for a change-over switch controlling the theft module. The housing is fastened via the plug connection elements at the rear wall of the car radio such that the change-over switch is inevitably actuated by the frame of the installation recess during the sliding-out of the radio.

8 Claims, 2 Drawing Sheets

ANTI-THEFT DEVICE FOR AN AUTOMOBILE AUDIO SET

BACKGROUND AND SUMMARY OF THE INVENTION

The invention relates to an anti-theft device for an audio set which is slidingly installed in an installation recess of a motor vehicle, and which has an actuatable theft module controlled by a change-over switch which s actuated to prevent operation of the audio set when the audio set is pulled out of the installation recess. A change-over switch is provided which has at least one switching position wherein it is electrically connected through a first plug connection, at the rear wall of the audio set and with a theft module in the audio set. The switch means is movable to a second position upon an unauthorized pulling out of the audio set to cause actuation of the theft module as a result of a change of electrical potential, created by the switch. The audio set additionally has a second plug connection with a power supply from the wiring system of the motor vehicle to run the audio set.

An anti-theft device of this general type is known from German Patent Application No. (DE-PS) 36 19 523, which corresponds to U.S. patent application Ser. No. 060,315, filed June 10, 1987 now U.S. Pat. No. 4,805,233. There, the change-over switch is integrated into an audio housing and changes a theft module input from the ground potential to a positive potential, and thus renders the audio set inoperative in the case of an unauthorized removal of the audio set.

Although such an integrated change-over switch has the advantage that it is securely actuated during the installation and the removal of the audio set and thus responds reliably, it has the disadvantage that an installation space must also be provided for the change-over switch as well as an opening for the mechanism actuating it (switching spring, switching lever, switching tappet) in the audio set housing itself.

One object of the invention is to provide a similar type of an anti-theft device such that, while the security with respect to error functions is maintained, no installation of a switch mechanism has to be carried at the audio set itself.

The objects of the invention are obtained by providing a separate housing means for containing the change-over switch, as well as first and second output plug connection elements which mate with plug connection elements at the rear wall of the audio set. These connections elements provide for a change-over in potential to the theft module from the wiring system of the motor vehicle when the change-over switch is actuated.

Also provided are connection elements with the wiring system of the vehicle into the housing itself. The housing has two multiple pole input plug connecting elements and a line connection for the audio set is led from a pole of one of the plug connection elements to a pole of the second input plug connection element, and from another pole of the second input plug connection element to a pole of one of the output plug connection elements.

This line connection is closed by a bridge between two poles of a cable plug which is inserted into the second input plug connection element for operation of the anti-theft device, but is not required for directing the power supply to the audio set itself.

In such an operation, it is desirable that the change-over switch be a microswitch operated by a switching lever which is triggered upon removal of the audio set from the recess. Upon removal of the audio set, the microswitch is then activated to change a ground connection to the anti-theft device to a positive source of power from the wiring system of the vehicle.

In addition, a burglar alarm system means is connected to the audio set by the second input plug connection element and the change-over switch in the housing. Thus, when a change of potential occurs at either the change-over switch or the theft module, the burglar alarm will be triggered due to the change of potential.

Additionally, one can provide a key operated switch which directly controls the theft module in order to render the audio set inoperative.

Additionally, mechanically pull off protectors which are well known to those skilled in the art are provided at all plug elements and cable plug means.

Although the electric change-over switch controlling the theft module must no longer be arranged directly in the housing of the audio set, it is, by the integration into a joint housing with plug connection elements which, among other things, are used for supplying current to the audio set, inevitable coupled with it. Thus, after the proper connecting of the plug connections, the change-over switch is inevitably in the position that is appropriate for its objective.

Plug-type connections with assigned electrical switches are known per se (Catalogue DS 4/410, Edition 1, "Steckverbinder" (Pin and Socket Connectors) of Hirschmann Co., Esslingen, Page 178/179); and from DE-AS No. 29 08 157, a multiple-pole trailer socket is known with a switch-off device for the rear fog light of the towing vehicle.

In the case of these plug connections, the respective change-over or break switch is arranged at the socket and is, in each case, actuated by the corresponding plug.

Other objects, advantages and novel features of the present invention will become apparent from the following detailed description of the invention when considered in conjunction with the accompanying drawings.

DETAILED DESCRIPTION OF THE DRAWINGS

Figure 1:
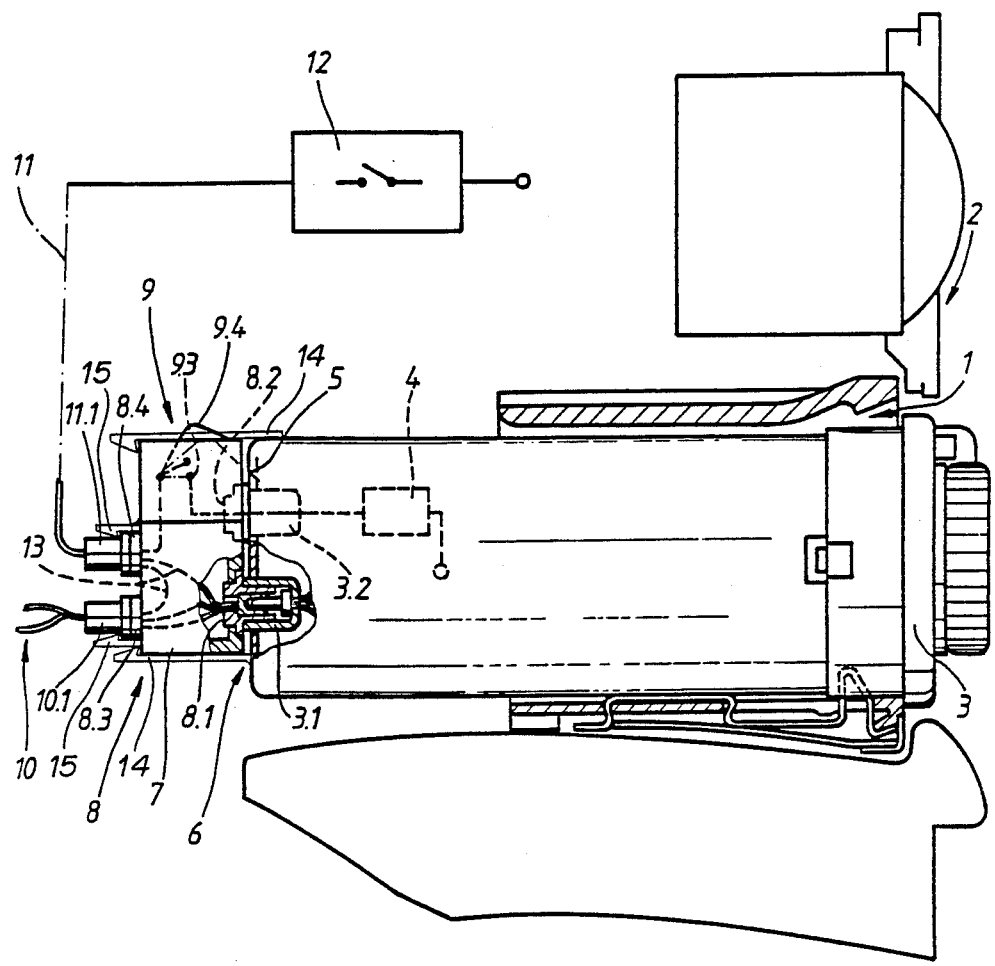
FIG. 1 is a schematic view of an audio set installed in the installation recess, with the joint housing for the plug connection and the change-over switch.

According to FIG. 1, a radio 3 is shown after it is slidably inserted into a longitudinally cut installation recess 1 of an instrument panel 2 of a motor vehicle. A theft module 4 is arranged in the radio 3. At the rear wall 5 of the radio is a multiple-pole plug connection 6 shown in a cut-away view. This plug connection serves to connect a power supply to the radio and consists of a first plug connection element 3.1 located on the radio and a first output plug connection element 8.1 of an adaptor plug 8. The adapter plug 8 has a housing 7, a second output plug connection element 8.2, a first input plug connection element 8.3, a second input plug connection element 8.4 and a three-pin change-over switch 9.

The second output plug connection element 8.2 is fitted on a second plug connection element 3.2 on the radio and connects a contact of the change-over switch 9 with the theft module 4. A power supply cable 10 is connected to the first input plug connection element 8.3 by a cable plug 10.1. Thus electric power can be supplied from plug 10.1 to plug 3.1 to power such things as radio lights, amplifier, signal setting circuits, etc.

A switchable voltage source 12 is connected to the second input plug connection element 8.4 via a cable 11 and a cable plug 11.1. The voltage source 12 may be a control instrument of a burglar alarm system (EDW), or may also be a wiring connection that can be switched by a key-operated switch, for example.

Figure 2:
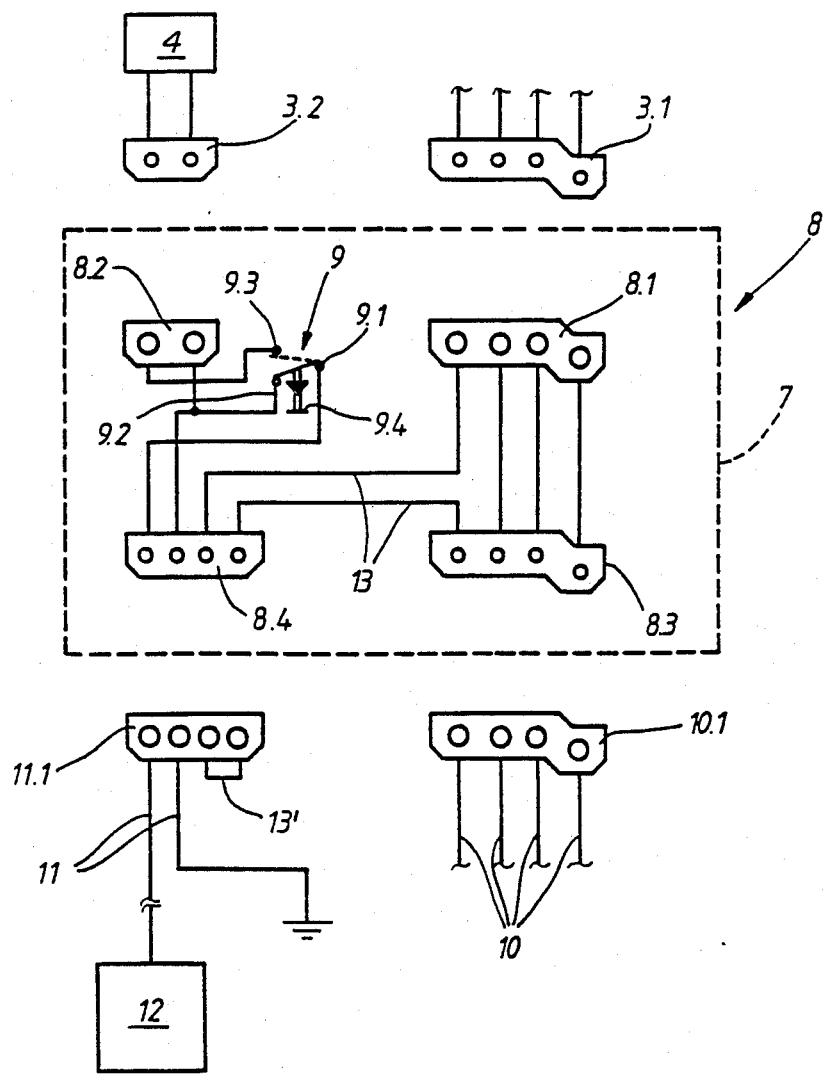
FIG. 2 is a connection diagram for the adapter plug.

The method of operation of the anti-theft device and the electric arrangement of the adapter plug 8 are shown in FIG. 2. The same reference numbers refer to the same parts in FIGS. 1 and 2. The schematically represented plug connection elements are non-interchangeable because they have either a different number of contact pins or have different outer contours. The small circles denote the electrical contact pins, while the large circles denote the corresponding contact bushes which mate with these pins.

The change-over switch 9 is shown in full lines in its inoperative starting position. Switching contact 9.1, is a fixed contact which is either without any potential or is grounded. When its switching lever 9.4 abuts against the edge of the installation recess 1 as the radio 3 is slid into, or out of, installation recess 1, the switching contact 9.1 is disconnected from the ground and connected with a second fixed contact 9.3 (dash-dotted in FIG. 1). Thus, an electrical connection is also established between the switchable voltage source 12 and the theft module 4 through the mating of plug connections 11.1 and 8.4 and plug connections 8.2 and 3.2.

If this voltage source 12 is a control instrument of a burglar alarm system, the latter "notices" the potential changing process which takes place when the change-over switch is operated and, if it is switched on or focused, applies the positive potential to the theft module 4. The radio becomes inoperative, and the alarm is triggered.

If the voltage source 12 is connected to the adapter plug 8 directly via key-operated switches, by the positive potential of the wiring system, the potential change at the theft module 4 is switched directly by the change-over switch 9 itself when it changes from a positive potential to an open circuit. The radio becomes inoperative. An erroneous control of the theft module 4 cannot take place during the regular operation because the change-over switch 9 is not connected with the voltage source 12 due to the open circuit.

The AND-operation of both input plug connection elements 8.3, 8.4 of the adapter plug 8 by a line connection 13 also serves the reliability of the anti-theft device. This (positive or ground) line connection 13 required for the power supply of the radio is closed at the input plug connection element 8.4 only by a bridge 13' between two poles of the cable plug 11.1. Thus, for the start of the operation of the radio 3, both cable plugs 10.1 and 11.1 must be inserted in order that the positive power applied to the radio be connected to a negative or grounded source. Naturally, in the embodiment according to FIG. 2, the number of poles of the plug connection is limited to the poles that are required for the operation. If required, other operations may be connected by additional poles, which are not relevant for the anti-theft device and are not absolutely necessary for the operation of the car radio.

Also if required, mechanical pull-off protection devices 14, 15 may be provided at the change-over switch and at the cable plugs which, preferably, can be released only when the rear wall is opened up, i.e., when the radio is removed. Thus it becomes impossible to circumvent the actuating of the change-over switch during the pulling-out.

For the stationary operation in the shop, the cable plug 10.1 may be connected directly to the plug connection element 3.1 of the rear wall of the radio.

Finally, the protection device also includes a joint housing for the change-over switch 9 and the output plug and the fixedly connected connection elements 8.1 and 8.2 which in turn are therefore not plugged in cable trees 10, 11. During initial installation of the radio, the switch at the power source 12 will not be turned on in order that the alarm will not ring in the factory. The adapter plug 8 and change over switch 9 are attached to the radio 3 and secured by pull-off protection devices 14 as is shown in DE-PS No. 29 08 517. The electrical connection plugs 11.1 and 10.1 are also secured by pull-off protection devices, either before, or as the radio is slid into its installation recess 1. When the change over witch is activated as it is slide into the recess 1, the anti-theft device 4 will not be armed, since the switch at the voltage source 12 is open and therefore no positive electrical connection to line 11 occurs. Also the alarm at switch 12 will not sound since the switch is open. Thus, the fact that change-over switch 9 moves from contact 9.2 (connected to ground through plug 11.1) to contact 9.3, the theft module 4 is not triggered, nor is the alarm.

After installation the anti-theft and alarm systems are armed by closing the key operated switch for the voltage source 12. Then if the radio is moved out of its installation recess 1, the switch 9.1 will again be activated from its normal connection at 9.2 to connect at 9.3. This connection will electrically trigger the anti-theft device 4 in the radio, rendering the radio inoperative (until the anti-theft device 4 is electrically retriggered) and will sound the alarm warning that the radio is being removed.

If the radio is to be worked on by an authorized person, the owner can deactivate the system by the key activated switch to allow removal without activation of the alarm and anti-theft device.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An anti-theft device for an audio set slidably insertable into an installation recess of a motor vehicle and which has an actuatable module means controlled by a change-over switch means which is actuated to prevent operation of the audio set when the audio set is pulled out of the installation recess, comprising:
   a change-over switch means which, in at least one switching position, is electrically connected through a first plug connection element means at the rear wall of the audio set with a theft module means of the audio set, which change-over switch means is moved to a second position upon an unauthorized pulling out of the audio set to cause actuation of the theft module means as a result of a change of electrical potential, as a result of which the audio set is rendered inoperative;

the audio set, at its rear wall, having at least a second plug connection element means connectable to a power supply from the wiring system of the motor vehicle;

a housing contains the change-over switch means, as well as plug connection element means which match the plug connection element means at the rear wall of the audio set and which are connectable therewith;

and wherein the change-over switch means has at least one contact connectable with the wiring system of the motor vehicle.

2. An anti-theft device according to claim 1, wherein the housing has an adapter plug which is connected by means of the output plug connection element means with the plug connection element input plug connection element means, which are connectable via cable plugs with cable trees of the wiring system of the motor vehicle.

3. An anti-theft device according to claim 2, wherein the housing has two multiple-pole input plug connection element means and wherein at least one line connection means, for the power supply of the audio set, is led from a pole of one of the input plug connection element means to a pole of the second input plug connection element means, and from another pole of the second input plug connection element means to a pole of one of the output plug connection element means;

said line connection being closed by a bridge between two poles of a cable plug which is inserted into the second input plug connection element means for operation of the anti-theft device.

4. An anti-theft device according to claim 1, wherein the change-over switch mans is constructed as a microswitch actuated by a switching lever.

5. An anti-theft device according to claim 1, wherein the change-over switch means is connected to a manually operable switch which is not connected with the theft module means and wherein only the change over switch means is moved to a conductive contact connected with the theft module when the audio set is pulled out of the installation recess.

6. An anti-theft device according to claim 3, characterized in that a burglar alarm system means is connected to the audio set by the second input plug connection element means and the change-over switch, triggering its alarm when a change of potential at the change-over switch takes place by the actuating of the change-over switch means.

7. An anti-theft device according to claim 1, wherein positive potential from the wiring system is applied to the change-over switch means, which change over switch means in the installed position of the audio set is not electrically connected with the theft module, and wherein during an unauthorized pulling-out of the audio set, the theft module is controlled directly via the change-over switch in order to render the audio set inoperative.

8. An anti-theft device according to claim 2, wherein mechanical pull-off protection means are provided at all plug connection element means and cable plug means.

* * * * *